Dec. 9, 1969    W. W. KORF    3,482,283

INJECTION MOLDING DEVICE

Filed Dec. 3, 1965

Inventor:
Wilhelm Willy Korf
by Michael J. Striker
A. Hay

# United States Patent Office 3,482,283
Patented Dec. 9, 1969

3,482,283
INJECTION MOLDING DEVICE
Wilhelm Willy Korf, Baden-Baden, Germany, assignor to Ferrotest G.m.b.H., Basel, Switzerland
Filed Dec. 3, 1965, Ser. No. 511,472
Claims priority, application Germany, Dec. 9, 1964, F 44,651
Int. Cl. B29f 1/03
U.S. Cl. 18—30                                                    3 Claims

ABSTRACT OF THE DISCLOSURE

In an injection molding device for molding a jacket of synthetic plastic material about the juncture of two intersecting metallic bars, a composite mold is provided which includes two separable mold sections together defining a mold cavity configurated to accommodate the aforementioned juncture with clearance. An injection nozzle or synthetic plastic material is rigid with one of the mold sections and has an orifice immediately adjacent to and communicating with a part of the mold cavity so that synthetic plastic material introduced into the mold cavity will form a jacket in the clearance and surround the juncture of the bars connecting the same to one another.

---

Figure 1:
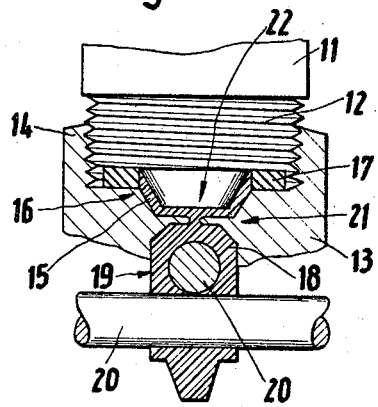

The present invention relates to an injection molding device. More specifically, the invention relates to an injection molding device for the molding of plastic bodies or jackets about the point of intersection of metallic bars or rods which intersect one another and which, when the molding operation is completed, will form part of a concrete-reinforcing network. Still more specifically, the invention relates to an injection molding device in which the injection-molding head is rigidly connected with at least one part of an injection mold. The invention further relates to an injection molding device which is provided with a means for preventing entry of material into the mold cavity in excess of a predetermined quantity.

It is known, and set forth in my copending application Ser. No. 263,823, to construct concrete-reinforcing networks by providing a plurality of bars which are disposed at angles to one another, and securing these bars together by casting or molding plastic bodies or plastic jackets about the points of intersetcion of the bars. Advantageously this is accomplished by providing a two-part mold for each plastic jacket to be cast so that, when the jacket is finally formed, the mold can be readily removed by separating the two mold sections. In these molds, as well as in other molds known heretofore, it is customary to provide a recess in one part of the mold, or in one of the mold sections, into which the nozzle of an injection-molding head extends. This recess then communicates with the mold cavity so that material may be injected from the injection head into the mold cavity. However, a drawback of these prior-art arrangements has been found to be the fact that during the rather quick succession of operations, which is required if the process is to be economical, and during the artificial cooling of the mold sections necessitated thereby, portions of the plastic material which remain in the passage leading from the recess to the mold cavity will harden, and completely or at least partially close the passage leading to the mold cavity after only a few injection occurrences. This requires shut-down of the machine so that the molds can be cleaned. If the encrustations are not immediately discovered, then the machine will continue to operate and during each molding operation the mold cavities will be filled only partially since not enough material can enter into them, whereby inferior jackets will result.

It is therefore a general object of the present invention to overcome the above-mentioned drawbacks.

A more specific object of the present invention is to provide a connection between injecting head and mold which will prevent encrustation of material during cooling of the mold.

Another object of the invention is to provide a device as set forth above which will prevent the entry of an excess of material into the mold cavity. In other words, it is desired that only a predetermined quantity of material be allowed to enter the mold cavity, so that little or no overflow will take place from the cavity into the injection passage.

In accordance with one aspect of the present invention, I provide, in an injection-molding device, a mold defining a mold cavity, and injecting means which comprises an injection nozzle rigid with the mold and having an orifice located immediately adjacent to and communicating with a portion of the mold cavity.

In accordance with the invention the orifice of the injection nozzle, which latter is rigidly connected with a section of the mold by screwing or otherwise securing it thereto, is located so close to the mold cavity that only a very short passage will remain between the orifice and the mold cavity. In other words, the recess in the mold section will be so deep that only a wall of relatively minor thickness will remain between the orifice and the mold cavity. This achieves that the nozzle is always rigidly connected with one of the mold sections so that no fitting of the nozzle into the recess of the mold is necessary for each operation. At the same time it largely overcomes the encrustation of plastic material in the passage since the passage is eliminated for all intents and purposes, having been made very short. This, in turn, assures that the remaining very short passage will be open at all times and that therefore identical amounts of plastic material will enter into the mold cavity during each molding operation.

It will be understood that an arrangement of this type has additional advantages beyond those set forth above. For example, the flashing which remains upon separation of the mold sections, that is the amount of plastic material which extends beyond the mold cavity into the small passage leading to the orifice of the injection nozzle, will be very short and since the passage will preferably have a small cross-sectional area over at least part of its length, the flashing will also tear or break readily when the mold sections are separated, thus permitting removal of the mold section from the finished plastic jacket. Advantageously the short passage in the thin wall which separates the orifice of the injection nozzle from the mold cavity will be so dimensioned that it will have its smallest cross-sectional area at its axial center and will widen in both directions. In other words, it will diverge in opposite directions away from the point of smallest cross-sectional area. Thus, this passage will be provided with a narrowest point at which the flashing will break off when the mold is separated. Of course it is possible to have the passage diverge only to one side, if this is desired.

Advantageously there will also be provided between the separating wall and the injection nozzle a clearance which during injection will fill with liquid plastic material. In view of the fact that the injection nozzle and the mold section are rigidly connected with one another so that the space therebetween is sealed from the ambient atmosphere, this plastic material will remain liquid. For sealing purposes a ring of sealing material will advantageously be interposed between a suitable shoulder or projection provided on the injection nozzle and a similar shoulder or projection provided on the respective mold section to which the nozzle is secured, so as to prevent escape of material from the mold and to seal the aforementioned space from the atmosphere. This is important, since contact with the atmosphere would cause the material to set.

It is further possible to provide a valve means, which is arranged in the outlet passage of the injection nozzle and helps to prevent introduction of further plastic material into the mold cavity when this is not desired.

Figure 2:
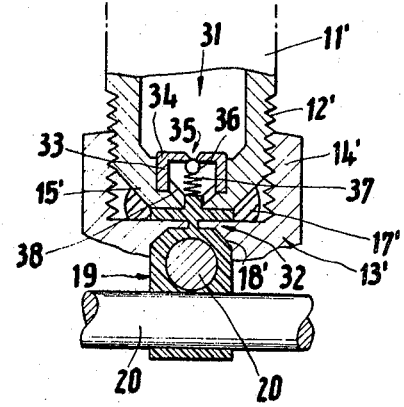
Figure 3:
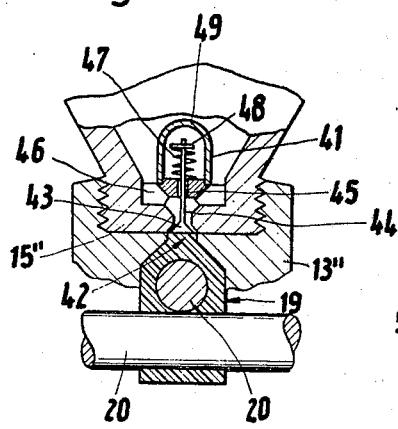
Figure 4:
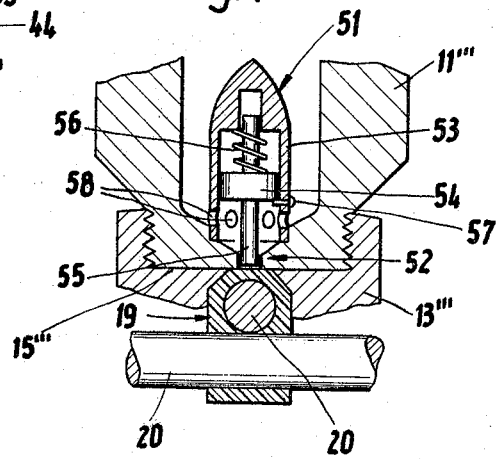

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partially sectioned view of two of the intersecting bars and of one section of a two-section mold to which an injection nozzle is secured, the other section being omitted for clarity; and FIGS. 2–4 represent similar views of modified embodiments of the invention shown in FIG. 1.

Discussing now the drawing in detail, and firstly FIG. 1 thereof, it will be seen that the injection nozzle 11, which of course forms part of an injection-molding machine which is not shown, is provided with a threaded portion 12 thereon which threadedly mates with a similar thread 14 provided on one of the mold sections, namely the upper mold section 13 of a two-section injection mold of which the lower section is omitted for clarity. The nozzle portion 15 of the injecting head 11 is conical or frusto-conical and is received in a corresponding and slightly larger-dimensioned recess 16 in the mold section 13, the thread 14 being provided in the peripheral wall of the recess 16. A seal, such as a ring 17 of rubber, plastic, or some other suitable sealing material, is interposed between the injecting head 11 and the mold section 13 so as to seal the space remaining between the nozzle 15 and the mold section 13. The mold section 13 together with the aforementioned non-illustrated second mold section, defines a mold cavity 18 which surrounds the point of intersection of two crossed bars 20, and in this mold cavity 18 a jacket 19 of plastic material is formed by injecting this plastic material into the mold cavity. The mold cavity 18 is separated from the recess 16 by a relatively thin wall 21 in which there is provided the aperture 22 which communicates with both the mold cavity 18 and the recess 16. This aperture 22 frusto-conically diverges from an axially central point in both directions so that at its axial center it has an area of smallest cross-section. This arrangement permits, when the two mold sections are separated and the plastic jacket 19 is removed, a simple and reliable breaking-off of the flashing which forms in this aperture 22 during molding.

Upon injection of plastic material into the mold cavity 18, the space existing in the recess 16 between the peripheral wall of recess 16 and the injecting nozzle 15 is filled with liquid plastic material. However, in view of the particular construction of the inventive arrangement, and particularly because the entry of cooling air to this space is prevented, this plastic material will not harden or encrust, but will always permit passage of new plastic material therethrough and through the aperture 22 into the mold cavity 18.

The embodiment of FIG. 2 is somewhat modified. The injecting head 11' shown there is provided with a thread 12' secured by means of a complementary thread 14' to a mold section 13'. A valve 31 is arranged in the outlet passage of the injection nozzle 15' and permits shutting-off of the molding machine from the orifice 32 in the injection nozzle 15' as long as no elevated pressure is exerted on the liquid plastic material contained in the machine.

The valve 31 comprises a cap 33 which is of substantially U-shaped configuration and whose end wall 34 faces away from the orifice 32 while its interior faces this orifice. The end wall 34 is provided with an opening 35 against which a valve member in the form of a ball 36 is biased by a spring 37 in the interior of the cap 33. The other end of the spring 37 abuts against a yoke 38 which is so constructed that it permits plastic material, which enters into the interior of the cap 33 through the opening 35, to pass around the yoke into the orifice 32 and from there into the mold cavity 18'. As soon as pressure on the liquid plastic material is reduced or ceases after the requisite quantity of material has been injected into the mold cavity 18', the spring 37 will bias the ball 36 against the opening 35 in the end wall 34 of cap 33 so that no further plastic material can enter into the cap and from there into the mold cavity. Some additional material will still remain in the interior of the cap 33; however, as a result of its relatively high viscosity and the small cross-sectional area of the orifice 32 this material will remain in the cap and upon separation of the two mold sections the flash will then break off.

Another embodiment of the invention is shown in FIG. 3. Here, the valve is designated with reference numeral 41 and it will be seen that the aperture 42 of the nozzle 15" is provided with a valve plate 43 which is carried on one end of a valve rod 44 guided in a bore 45 of a yoke 46 bridging the orifice 42. A spring 47 abuts against the yoke 46 and cooperates with a stop member 48 provided on the inner end of the valve rod 44 and tends to withdraw the valve plate 43 into the closed position of the latter, in which it is located in the orifice 42. A cap 49, which is rigidly secured to the yoke 46, covers the spring 47 and the inner end of shaft 44 so as to enable a proper and unhindered operation of the valve arrangement 41. When, during operation of the device liquid plastic material is pressed through the orifice 42, this material flows around the cap 49 and the yoke 46 and pushes the valve plate 43 away from its seat. When the injection process is completed and pressure drops, the valve plate 43 with its rod 44 is again withdrawn into closure position and closes the orifice 42, thus preventing the entry of additional material from the orifice 42 into the mold cavity. Thus the additional material which may still be under some pressure in the molding machine, is prevented from exiting through the orifice 42. This arrangement is preferred because it provides a clean separation of the flash from the jacket 19" when the mold is opened.

A further embodiment of the invention is shown in FIG. 4 and it will be seen that it is somewhat similar to that in FIG. 3. The nozzle 15''' is provided in its interior with a valve arrangement 51 which is located rearwardly or inwardly of the orifice 52. This valve comprises a sleeve 53 which may be conical in the direction inwardly of the nozzle, that is in the direction away from the orifice 52. The sleeve is hollow and a piston 54, which extends into close contact with the inner wall of the sleeve 53, is axially movable therein. A cylindrical valve member or shaft 55 is secured to the piston for movement therewith and a front portion of this member 55 extends into the orifice 52 and, in the closure position of the valve arrangement 51, closes this orifice 52. A re-setting spring 56 biases the piston 54 and thereby the member 55 into closure position and the maximum closure position is delimited by a suitable stop member, such as a bolt 57 or the like provided on the wall of sleeve 53 in the path of piston 54. Arranged in the wall of sleeve 53 intermediate the piston 54 and the orifice 52 are one or more openings 58 which communicate with the interior of the nozzle and with the interior of the sleeve 53. If, now, the material within the nozzle is placed under pressure, then it will pass through the opening or openings 56 into the interior of the sleeve 53 downwardly of the piston 54, that is on the side of the piston 54 which is located away from the spring 56. This causes the piston 54 to move in a direction in which it will compress the spring 56, whereby the member 55 is withdrawn with its front end portion from the orifice 52 so that the material can now pass through this orifice 52 into the mold cavity. When pressure on the material in the nozzle is released or sufficiently relaxed, the spring 56 again biases the piston 54 towards the orifice 52, so that the end portion of the member 55 is returned into the orifice 52 and closes the same. Since, as will be seen from FIG. 4, the cross-sectional area of the end portion of member 55 corresponds to that of the orifice 52, the member 55 will fully and completely close the orifice 52 so that there is an automatic cut-off of the jacket 19 at this point. In other words, when the jacket 19 is removed from the mold there will be no flash there at all, or only very little.

It will be understood that each of the elements described above, or two or more together, may also find a useful application in other types of an injection molding device, differing from the types described above.

While the invention has been illustrated and described as embodied in an injection molding device, it is not intended to be limited to the details shown, since various modifications and structural changes may be made without departing in any way from the spirit of the present invention.

Without further analysis, the foregoing will so fully reveal the gist of the present invention, that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an injection molding device for molding a jacket of synthetic plastic material about the juncture of two intersecting metallic bars, the combination of mold means defining a mold cavity and having an aperture communicating with said cavity; an injection nozzle rigidly connected to said mold means and having an orifice immediately adjacent to said aperture and communicating through the same with said mold cavity, for introducing a synthetic plastic material into said cavity; and valve means arranged in said injection nozzle for interrupting the flow of plastic material into said mold cavity upon the pressure of said material in said nozzle falling below a predetermined level, said valve means comprising a hollow cap arranged in the ejection passage of said nozzle partially closing said passage, with the hollow portion of said cap facing said orifice, a yoke extending transversely of said passage downwardly of said cap, said yoke closing said hollow portion of said cap while only partially closing said passage, said yoke further having a bore therethrough communicating with the interior of said cap; and wherein said valve means further comprises a guide rod extending through said bore of said yoke and into the interior of said cap so as to be guided by said bore for axial movement, said rod having a front end having a valve member thereon which is received in said aperture and sealingly closes said aperture upon movement of said rod in a direction outwardly away from said mold cavity, and a rear end carrying a stop member; and said valve means further comprising a compression spring surrounding said rod in the interior of said cap and engaging said yoke and said stop member so as to normally bias said valve member to said closure position in which it sealingly closes said aperture.

2. In an injection molding device for molding a jacket of synthetic plastic material about the juncture of two intersecting metallic bars, the combination of mold means defining a mold cavity and having an aperture communicating with said cavity; an injection nozzle rigidly connected to said mold means and having an orifice immediately adjacent to said aperture and communicating through the same with said mold cavity, for introducing a synthetic plastic material into said mold cavity; and valve means arranged in said injection nozzle for interrupting the flow of plastic material into said mold cavity upon the pressure of said material in said nozzle falling below a predetermined level, said valve means comprising a hollow cap arranged in the ejection passage of said nozzle partially closing said passage, with the hollow portion of said cap facing said orifice, means extending transversely of said passage downwardly of said cap closing said hollow portion but only partially closing said passage, elongated guide means movable axially of said aperture and having a rear portion located in the interior of said cap and a front portion having a valve member thereon which is received in said aperture and sealingly closes the same upon movement of said elongated guide means in a direction outwardly away from said mold cavity, and spring means in the interior of said cap and being operatively associated with said guide means for normally biasing said valve member provided thereon to said closure position in which it sealingly closes said aperture.

3. An injection-molding device as defined in claim 2, wherein said mold means is provided with a nozzle-accommodating bore extending between an external surface of said mold means and said mold cavity, and terminating short of the latter, so that a wall portion is interposed between said bore and said cavity; and wherein said wall portion is provided with an aperture therethrough of a minimum cross section considerably less than said bore.

References Cited
UNITED STATES PATENTS

| | | | |
|---|---|---|---|
| 2,341,991 | 2/1944 | Jackson | 18—30 |
| 2,475,267 | 7/1949 | Winegar | 18—30 |
| 2,582,260 | 1/1952 | Kutik | 18—30 |
| 2,911,680 | 11/1959 | Kelly | 18—30 |
| 2,928,125 | 3/1960 | Smucker et al. | 18—30 X |
| 3,010,156 | 11/1961 | Smith | 18—30 |
| 2,428,275 | 9/1947 | Frankwich et al. | 18—30 |
| 2,957,214 | 10/1960 | Kuharski | 249—97 X |
| 3,135,020 | 6/1964 | Holl et al. | 18—30 |

FOREIGN PATENTS

| | | |
|---|---|---|
| 912,194 | 10/1946 | France. |
| 1,042,226 | 10/1958 | Germany. |
| 547,969 | 11/1959 | Belgium. |

WILBUR L. McBAY, Primary Examiner

U.S. Cl. X.R.
18—30; 264—328